United States Patent
Rist et al.

(10) Patent No.: US 7,330,443 B2
(45) Date of Patent: Feb. 12, 2008

(54) METHOD FOR PROVIDING CTI SERVICES OR FEATURES VIA COMMUNICATION CHANNEL HAVING COMMUNICATION CONNECTIONS

(75) Inventors: Claus Rist, Bochum (DE); Stephan Schaumburg, Reken (DE); Michael Volkmann, Herdecke (DE)

(73) Assignee: Siemens Aktiengesellschaft, Munich (DE)

( * ) Notice: Subject to any disclaimer, the term of this patent is extended or adjusted under 35 U.S.C. 154(b) by 954 days.

(21) Appl. No.: 10/652,615

(22) Filed: Sep. 2, 2003

(65) Prior Publication Data
US 2004/0109556 A1 Jun. 10, 2004

(30) Foreign Application Priority Data
Sep. 2, 2002 (DE) .................... 102 40 466

(51) Int. Cl.
*H04L 12/16* (2006.01)
(52) U.S. Cl. ............ 370/264; 370/522; 379/234
(58) Field of Classification Search .......... None
See application file for complete search history.

(56) References Cited

U.S. PATENT DOCUMENTS

| | | | |
|---|---|---|---|
| 6,021,428 A * | 2/2000 | Miloslavsky | 709/206 |
| 6,094,479 A * | 7/2000 | Lindeberg et al. | 379/220.01 |
| 6,181,691 B1 * | 1/2001 | Markgraf et al. | 370/352 |
| 6,577,724 B1 * | 6/2003 | Hagemann | 379/229 |
| 6,668,286 B2 * | 12/2003 | Bateman et al. | 710/6 |
| 2001/0054107 A1 * | 12/2001 | Aufderheide | 709/237 |

OTHER PUBLICATIONS

European Search Report for European Patent Application No. 03 10 2489.6, mailed Jun. 1, 2007.
"ICs for Communications - IOM2 Interface Reference Guide", Siemens AG, Munich, Germany, Mar. 1991, ordering no. B115-H6397-X-X-7600, pp. 6-12.
"Protocol for Computer Supported Telecommunications Applications (CSTA) Phase III", Standard ECMA-285, 2nd Edition; Jun. 2000; pp. A-D, i-viii, 1-404.
Telephony Services API, Version 2; Chapter 6, "Status Reporting Services"; Jan. 1997; printed Apr. 24, 2007 from www.cs.cornell.edu/courses/cs519/198fa/project/Doc/PBX/tsapi.pdf; pp. 6-1 to 6-11.
"ICs for Communications - IOM2 Interface Reference Guide", Siemens AG, Munich, Germany, Mar. 1991, ordering no. B115-H6397-X-X-7600, pp. 6-12.

* cited by examiner

*Primary Examiner*—Duc Ho
(74) *Attorney, Agent, or Firm*—Staas & Halsey LLP

(57) ABSTRACT

To provide CTI services or features via a communication channel having a plurality of communication connections, after communication of a request for a CTI service or feature for a selected communication connection, an assignment between a device ID, a connection ID and the requested CTI service or feature is established. A control sequence for setting the requested CTI service or feature is invoked, specifying an assignment identifier designating the assignment between the device ID, the connection ID and the requested CTI service or feature as the transferred parameter. The control sequence invoked is processed with evaluation of the assignment identifier to provide the requested CTI service or feature.

7 Claims, 2 Drawing Sheets

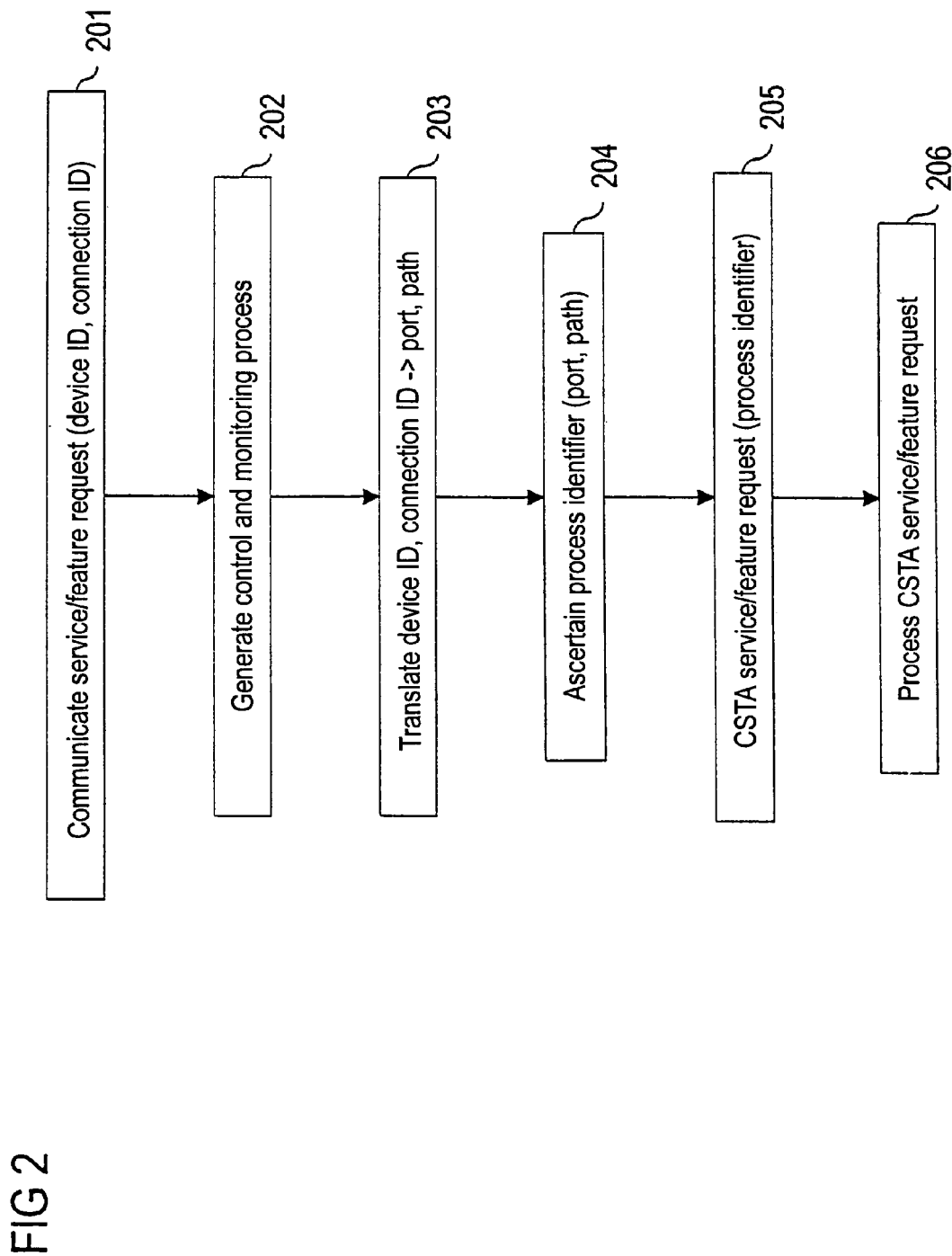

METHOD FOR PROVIDING CTI SERVICES OR FEATURES VIA COMMUNICATION CHANNEL HAVING COMMUNICATION CONNECTIONS

CROSS REFERENCE TO RELATED APPLICATIONS

This application is based on and hereby claims priority to German Application No. 102 40 466.6 filed on Sep. 2, 2002, the contents of which are hereby incorporated by reference.

BACKGROUND OF THE INVENTION

Computer Telephony Integration (CTI) is a value added service for increasing voice transmission efficiency. Using CTI services, very simple applications such as computer-aided dialing, through to all call center functions can be offered as services. CTI basically involves using computer technology to support telephone services. This includes not only support of features with their various call processing functions but also the control and monitoring of PBXs and call detail recording.

A CTI platform generally includes fault tolerant servers and supports ITU Recommendations H.100 and H.110. Functional features usually include intelligent, network-oriented call control as well as automation of control and monitoring functions within a call center, software- and database-controlled functions for automatic call distribution and mechanisms for collecting and inserting stored and evaluated contact data.

Various manufacturer-developed CTI platforms standardized by various standardizing bodies have emerged over the years. There is therefore a plethora of more or less inter-related standards. CTI is based on the one hand on known standards such as ISDN and, on the other hand, defines hardware structure standards and interface standards. One such interface standard, for example, is CSTA (Computer Supported Telecommunications Application). CSTA specifies the structure and type of messages for various service features, such as hold toggling, call diversion, three-way conference.

With the existing methods of providing CTI services or features, only a port-related provision of CTI services is possible, but not a connection-related provision. This means that services or features can only be provided via ISDN B-channels at ISDN multi-terminal accesses, specifically ISDN S0 ports, if a connection (call) exists for each ISDN B-channel.

SUMMARY OF THE INVENTION

An object of the present invention is to specify a method for providing CTI services or features via a communication channel having a plurality of communication connections.

An essential aspect of the present invention is that, when a CTI service or feature is requested for a selected communication connection, an assignment is established between a device ID, a connection ID and the requested service or feature. This creates a requirement that, when a control sequence is subsequently invoked, an assignment identifier designating the assignment is used as the transmission parameter, instead of the device ID as hitherto. As the assignment identifier implies a reference to the connection ID, the service or feature requested can be provided by processing the control sequence specifically for the communication connection selected.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 is a flowchart for a method for providing CTI services or features via a communication channel having a plurality of communication connections.

DETAILED DESCRIPTION OF THE PREFERRED EMBODIMENT

Figure 1:
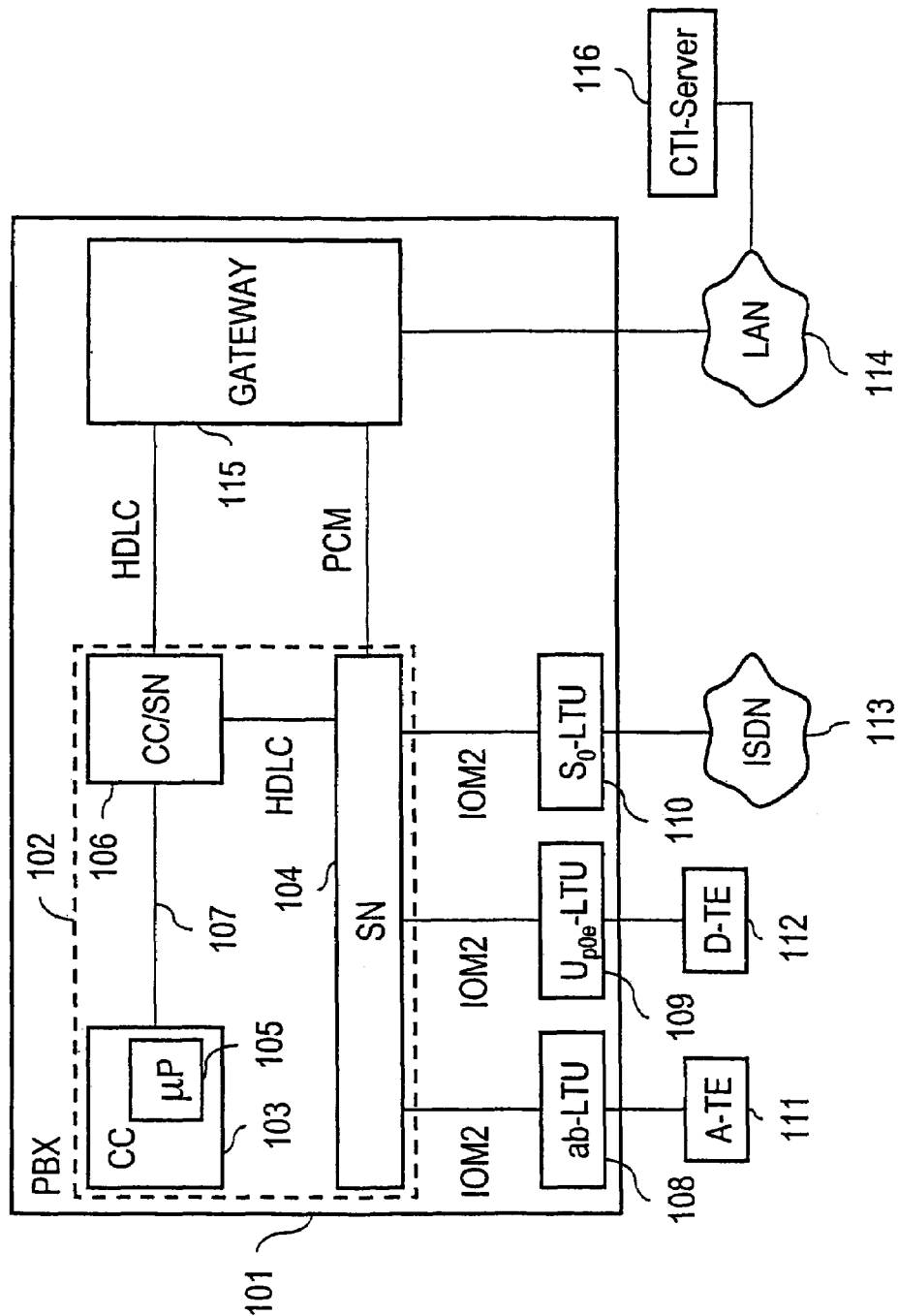
FIG. 1 is a block diagram of a PBX with a CTI server.

Reference will now be made in detail to the preferred embodiments of the present invention, examples of which are illustrated in the accompanying drawings, wherein like reference numerals refer to like elements throughout.

FIG. 1 schematically illustrates the design of a private branch exchange (PBX) 101 as described, for example, in WO 01/89231. The PBX 101 has a central unit 102 with a common control (CC) call processing equipment 103 and a switching network (SN) 104. The common control call processing equipment 103 incorporates a microprocessor 105 for controlling functions of the PBX 101. Voice or data channels to be connected are routed through the PBX 101 by the switching network 104. The common control call processing equipment 103 and the switching network 104 are interconnected via a conversion unit 106. A communications protocol used for a microprocessor bus 107 between the common control call processing equipment 103 and the conversion unit 106 and a high level data connection control (HDLC) protocol supported by the switching network 104 are bidirectionally inter-converted by the conversion unit 106.

Line trunk units 108, 109, 110 each generally disposed on a decentralized module are connected to the switching network 104 via trunk circuits. For example, an analog line trunk unit 108 is linked to an ab interface for connecting analog communication terminals 111, a digital line trunk unit 109 is linked to a Up0e interface for connecting digital communication terminals 112 and another digital line trunk unit 110 is linked to an S0 interface for connecting an ISDN communication network 113 to the PBX 101. Voice and data information is transmitted between the line trunk units 108,109, 110 and the switching network 104 in accordance with the ISDN oriented modular extended (IOM2) communications protocol. Details concerning the IOM2 communications protocol may be found in product information "ICs for Communications—IOM2 Interface Reference Guide", Siemens A G, Munich March 1991, ordering no. B115-H6397-X-X-7600, pages 6 to 12. Instead of the IOM2 communications protocol, the pulse code modulation (PCM) communications protocol can also be used for bidirectional data transfer between the switching network 104 and the line trunk units 108, 109, 110.

The PBX 101 has a separate gateway 115 for connecting the PBX 101 to a data network, e.g., a local area network (LAN) 114. The gateway 115 has a plurality of identical contact devices (not explicitly shown in FIG. 1) for connecting controller units. Controller units of this kind have an HDLC and a PCM interface to the central unit 102 and a standardized medium independent interface (MII) to a LAN access unit of the PBX 101. A connection between the LAN 114 and the LAN access unit can be implemented, for example, by a 10Base-T or a 100Base-T interface.

A controller unit of the gateway 115 is generally used for protocol-compliant preprocessing of control data received via the LAN 114 and for forwarding it to the central unit 102. The central unit 102 then controls the execution of the functions identified by the control data. This also includes functions to be performed by the gateway 115. The functions such as interconnecting different LANs, external access to network resources in the context of "teleworking", CTI applications or "Voice over IP" applications are performed by function-specific digital signal processors assigned to the gateway 115 which are controlled by the central control unit 103.

Servers provided e.g., for specific tasks and which make programs available to the PBX 101 that can be run on known personal computers but not in the common control call processing equipment 103 and do not therefore need to be ported to the PBX 101, can be connected to the LAN 114. In addition, the workload of the common control call processing unit 103 is reduced by relocation of a corresponding program scheduler so that process computing resources of the central control unit 103 can be used primarily for call control tasks.

A server provided for special tasks is constituted by a CTI server 116 connected to the LAN 114 and providing CTI applications (not shown explicitly in FIG. 1) for CTI clients assigned to a line trunk unit 111, 112, 113. As an alternative to connection of the CTI server 116 to the PBX 101 as shown in FIG. 1, the CTI server can also be implemented by a server module incorporated in the PBX 101.

The starting point of the flowchart shown in FIG. 2 is communication 201 of a service or feature request from a CTI client to the CTI server 116. For the service or feature request, a device ID and a connection ID are transferred as parameters, the connection ID designating a selected communication connection for which the requested service or feature is to be provided. A control and monitoring process for changing a call processing state depending on defined events is then generated 202.

With the generation of the control and monitoring process, the device ID, the connection ID and a process identifier assigned to the control and monitoring process generated are stored in a process list administered by the common control call processing unit 103. In addition, the call processing state of the communication connection selected is changed by the control and monitoring process running in the common control call processing equipment 103 in such a way that the state of the communication connection selected reflects the requested service or feature. This produces an assignment between the device ID, the connection ID and the service or feature requested, the assignment being unambiguously designated by the process identifier.

After generation of the control and monitoring process, the device ID and the connection ID are translated 203 into port and path information for use by the common control call processing equipment 103. The process identifier not yet known to the CTI server is then ascertained 204 on the basis of the port and path information and by the process list administered by the common control call processing equipment 103.

When the process identifier has been ascertained, a control sequence to be processed by the common control call processing equipment 103 for setting the required service or feature is invoked 205, specifying the process identifier as the transfer parameter, by the CTI server, and is processed 206 by the common control call processing equipment 103 on the basis of evaluation of the process identifier. Processing of the control sequence by the common control call processing equipment 103 has the effect of changing a call processing state of the communication system object designated by the transfer parameter. Communication system objects include, for example, ports, lines, channels or connections without restriction of the generality of this term.

In addition, connection-related data specifying the state of the selected communication connection and referencing the control and monitoring process assigned to the communication connection selected is stored by the common control call processing equipment 103.

Because of the linking of the process identifier and the connection-related data, processing of the control sequence with the process identifier being specified as the transfer parameter causes the call processing state of the communication connection selected to be changed. The requested service or feature is therefore provided as the result of processing of the control sequence for the communication connection selected.

The requested service or feature is preferably provided via an interface conforming to the CSTA standard. By a method according to the invention, existing CSTA applications can be used for providing services or features via communication channels having a plurality of communication connections. In addition, the requested service or feature is provided for use on a communication terminal connected to the PBX 101 via an ISDN S0 interface, the problems associated with providing services or features on ISDN multi-terminal accesses being overcome by a method according to the invention.

One application of the present invention is, for example, for the feature "Single Step Call Transfer With Reuse Of B-Channel". Using a method according to the invention, in the case of an existing communication connection between an A-party and a B-party, an new additional connection for a consultation call to a C-party can be set up, the same ISDN B-channel being used for this additional connection as for the connection between the A- and B-party.

The application of a method according to the invention is not limited to the exemplary embodiment described here.

The invention has been described in detail with particular reference to preferred embodiments thereof and examples, but it will be understood that variations and modifications can be effected within the spirit and scope of the invention.

The invention claimed is:

1. A method for providing at least one of computer telephony integration services and features via a communication channel having a plurality of communication connections, comprising:
   establishing an assignment between a device identifier, a connection identifier and at least one of a computer telephony integration service and feature for a selected communication connection in response to a request;
   invoking a control sequence for setting the at least one of a computer telephony integration service and feature by specifying an assignment identifier designating the assignment between the device identifier, the connection identifier and the at least one of a computer telephony integration service and feature as a transferred parameter;
   processing the control sequence with evaluation of the assignment identifier to provide the at least one of a computer telephony integration service and feature.

2. A method according to claim 1,
   wherein said establishing the assignment between the device identifier, the connection identifier and the at least one of a computer telephony integration service and feature comprises:

generating at least one of a control process and a monitoring process for changing a call processing state of the selected communication connection depending on defined events; and storing the device identifier, the connection identifier and a process identifier designating the at least one of a control process and a monitoring process in a process list, and wherein said processing comprises changing a state of the selected communication connection so that it reflects the at least one of a computer telephony integration service and feature.

3. A method according to claim 2, wherein the process identifier corresponds to the assignment identifier.

4. A method according to claim 3, further comprising initiating, by common control call processing equipment, storing of connection related data with the state of the selected communication connection being specified and with a reference to the at least one of a control process and a monitoring process assigned to the selected communication connection.

5. A method according to claim 4, wherein said processing of the control sequence includes changing a call processing state of a communication object designated by a parameter transferred when the control sequence is invoked.

6. A method according to claim 5, wherein the at least one of a computer telephony integration service and feature is provided via an interface conforming to a Computer Supported Telecommunications Application standard.

7. A method according to claim 6, wherein the at least one of a computer telephony integration service and feature is provided for use at a terminal connected to a private branch exchange via an ISDN S0 interface.

* * * * *